(12) United States Patent
Milnes Pizarro (10) Patent No.: US 9,513,031 B2
(45) Date of Patent: Dec. 6, 2016

(54) UNIT FOR HARNESSING SOLAR POWER (75) Inventor: Osvaldo Milnes Pizarro, Santiago (CL)

(73) Assignee: CALDER SOLAR LTDA., Nunao, Santiago (CL)

( * ) Notice: Subject to any disclaimer, the term of this patent is extended or adjusted under 35 U.S.C. 154(b) by 911 days.

(21) Appl. No.: 13/814,345

(22) PCT Filed: Aug. 3, 2011

(86) PCT No.: PCT/CL2011/000043
§ 371 (c)(1),
(2), (4) Date: Feb. 5, 2013

(87) PCT Pub. No.: WO2012/016345
PCT Pub. Date: Feb. 9, 2012

(65) Prior Publication Data
US 2013/0133642 A1    May 30, 2013

(30) Foreign Application Priority Data
Aug. 6, 2010 (CL) ................................ 848-2010

(51) Int. Cl.
| F24J 2/00 | (2014.01) |
| F24J 2/24 | (2006.01) |
| F24J 2/46 | (2006.01) |

(52) U.S. Cl.
CPC F24J 2/24 (2013.01); F24J 2/464 (2013.01); F24J 2/465 (2013.01); Y02E 10/44 (2013.01)

(58) Field of Classification Search
USPC ........................................ 126/643, 661, 663
See application file for complete search history.

(56) References Cited

U.S. PATENT DOCUMENTS 3,937,208 A * 2/1976 Katz .................. F24J 2/045
126/623
4,016,860 A * 4/1977 Moan ................. F24J 2/055
126/654

(Continued)

FOREIGN PATENT DOCUMENTS

| CA | 1291474 | 10/1991 |
| CH | 621622 | 2/1981 |

(Continued)

OTHER PUBLICATIONS

International Search Report for Application No. PCT/CL2011/000043 dated Dec. 16, 2011 (4 pages, English translation).

(Continued)

*Primary Examiner* — Avinash Savani
(74) *Attorney, Agent, or Firm* — Michael Best & Friedrich LLP (57) ABSTRACT

A unit for harnessing solar power for heating water at high pressure, in which the circuit is exposed to freezing, comprising: a heat exchanger made as a single piece for a hydraulic circuit, made up of parallel polymer pipes (1) connected at one end thereof to a main branch-off pipe (2, 3) and, at the other end thereof, to a main collector pipe (2, 3); a sealed box (4) for a whole number of units connected in series, having a profile of regular section (5), reinforced by brackets that can be inserted in corners, with a translucent face (6), the other face having an insulated cover (7); the profile having a geometry suitable for connecting the box to a support structure; the profile having a geometry suitable for holding the insulating material (8) and the rubber seals on the inner part of the translucent face (9); the profile being such that complementary profiles (10) may be assembled thereon, by snap-fitting, and the complementary profiles have a housing for rubber seals (11) on the outer part of the translucent face (6); means for connecting a water supply (Continued)

pipe (12) to the main branch-off pipe(s) and means for connecting a discharge pipe (13), in the direction of water consumption, to the main collector pipe(s). Use of the unit with direct connection to a pressurized water heater located on the unit, for heating the water of the water heater by means of circulation by convection. Use of the unit with direct connection to a pressurized water heater, which is in an arbitrary position with respect to the unit, with circulation by a hydraulic pump.

27 Claims, 4 Drawing Sheets

(56) References Cited

U.S. PATENT DOCUMENTS

| | | | |
|---|---|---|---|
| 4,131,111 A | 12/1978 | Hopper | |
| 4,150,720 A | 4/1979 | Brackman | |
| 4,155,346 A * | 5/1979 | Aresty | F24J 2/055 126/652 |
| 4,257,398 A * | 3/1981 | Watson | F24J 2/0477 126/612 |
| 4,333,789 A | 6/1982 | McAlister | |
| 4,382,468 A | 5/1983 | Hastwell | |
| 4,607,688 A * | 8/1986 | Sorensen | F24J 2/265 126/636 |
| 4,773,956 A | 9/1988 | Gross | |
| 4,867,133 A * | 9/1989 | Sadler | F16L 13/103 126/663 |
| 2002/0162222 A1 | 11/2002 | Williams et al. | |

FOREIGN PATENT DOCUMENTS

| | | |
|---|---|---|
| CH | 635652 | 4/1983 |
| DE | 7824699 | 12/1979 |
| DE | 20103314 | 6/2001 |
| DE | 10216625 | 10/2003 |
| DE | 10321422 | 1/2005 |
| EP | 0618411 | 10/1994 |
| FR | 2493949 | 5/1982 |
| GB | 2445222 | 7/2008 |
| WO | 2012016345 | 2/2012 |

OTHER PUBLICATIONS

International Preliminary Report on Patentability for Application No. PCT/CL2011/000043 dated Aug. 8, 2012 (6 pages, English translation).

Written Opinion for Application No. PCT/CL2011/000043 dated Dec. 16, 2011 (7 pages).

* cited by examiner

UNIT FOR HARNESSING SOLAR POWER

BACKGROUND AND SUMMARY OF THE INVENTION

The present invention consists of a unit to heat potable water for domestic consumption or for industrial use using solar energy. The unit can be applied based primarily on natural convection circulation of fluid, called thermo-siphon circulation, although forced circulation is also feasible. This unit is low cost, low maintenance, and has a long useful life. These features, combined with its high efficiency, make it a compact unit that is easy to install by being directly applied to pressurized water pipe networks. The temperatures involved in the described applications include water for potable or recreational home use and for potable industrial use.

The low cost of the units of the present invention is based on efficient utilization of polymeric materials together with high-performance industrial manufacturing processes. Consequently, the circulation of the fluid occurs in a exchanger made of polymeric material. The low maintenance of the units is possible due to the non-stick properties of polymers in general, especially those of the polymer used in the present invention, which in general have a different coefficient of thermal expansion than elements that tend to precipitate and adhere to the exchanger's internal surfaces. This translates to a low tendency to generate sediment and deposit buildup, especially in areas where available water has large amounts of diluted, suspended salts. Finally, a long useful life is achieved through an appropriate design that guarantees the mechanical durability of the exchanger, as well as the durability of the box containing the exchanger and the translucent cover of its side exposed to the sun. The mechanical durability of the exchanger is suitable for high pressure applications, i.e., connection directly to household potable water supply, and industrial potable water and fluid networks. Its mechanical durability includes an adequate capacity to account for freezing of the fluid inside the exchanger, especially when the fluid is water or some similar fluid that increases in volume when freezing, a scenario that is quite likely given that units are located outdoors for their operation.

Currently, in applications for heating water for domestic use, most of the systems that heat water through solar energy that are operated by thermo-siphon are made of rigid materials (copper, aluminum, glass) favoring their ability to transfer solar radiation into the water because of their high heat transfer coefficient over their ability to function correctly when other variables, such as the weather or environment, affect their operation. Among the variables that affect the proper functioning of a unit to heat water using solar energy is the possible freezing of the liquid to the inside of the panel and the generation of rust and deposit buildup from the contact between the water and the metal. Freezing brings about a liquid expansion to the inside of the collector with commensurate material damage, creating leaks in the system. The rust and deposit buildup, along with affecting the potability of the water, create an insulating crust that affects the efficiency of the system, which could block the pipes, preventing fluid recirculation. The described problems oblige the implementation of various systems to avoid malfunction from freezing, among which include:

The use of antifreeze liquids, for which the implementation of a heat exchanger is required to transfer heat from the antifreeze liquid flowing through the unit to the fluid to be used eventually.

Automatic drainage systems, where the panel is emptied when the temperature is equal to or less than 0 degrees Celsius, or the freezing point of the fluid being used.

Forced recirculation system, which re-circulates tank water when its temperature approaches freezing. For this, a pump and a differential thermostat must be installed, increasing the cost, complexity, and the possibility of malfunctioning of the unit to heat fluid through solar energy.

Regarding the formation of sediment and deposit buildup, state-of-the-art heat exchangers in the units should, after a certain period of operation, have their circuits cleaned thoroughly which requires partial or complete dismantling. This generates high maintenance costs, especially considering that the units usually have to be installed in hard-to-access places such as terraces and roofs.

Regarding state-of-the-art features, various disclosures on exchange units all point to small modifications that deviate from the main goal of this type of unit: to efficiently utilize available solar energy.

A system to connect a series of connecting pipes to a common intake to create a heat exchanger is detailed in document CH621622. The main difference between what is detailed in the cited document and the present invention lies in the composition of the joints of the intake manifold and the parallel connecting pipes. The document details mechanical joints made of three separate elements that allow for the configuration of an exchange circuit. The arrangement of three elements is maintained by mechanical interface, which does not ensure proper functioning when the internal fluid is pressurized due to the risk of leakage. This mechanical interface is based on the elastic strain on components during the assembly. This elastic force can diminish during the life of the joint and the exposure of the material to heat and solar radiation.

The exchanger of the present invention, on the other hand, is obtained by the arrangement of two elements: the manifold and pipes melted together by a thermo-fusion process, which creates a thermoplastic molecular union of the same type and quality as that found in the very material of the constituent parts. With this solution, leaks are eliminated because the interior circuit is one piece, which is able to operate at high pressure, allowing for its direct connection to potable water networks. The detailed framework of the cited document is used in pool collecting applications and in solar-heating circuits whose independent circuits are unpressurized, where operation under pressure is not required. A heat exchanger such as this detailed one has a difficult time withstanding use in freezing temperatures and when connected to pressurized networks, circumstances that frequently occur due to pressures from liquid hammering or pulsations from pumping systems.

Another document regarding state-of-the-art features that discloses details regarding the connection of the intake manifold to the parallel pipes is CA1291474. The detailed elements have a tube coil in whose transverse cutting it is possible to distinguish different rings of material (metal, rubber, and plastic) that allow for various applications, but whose primary one is to exchange heat from a primary source to a secondary source. This approach explains the layout of the pipes, which follows the logic of a radiator's layout, where what is sought is the creation a circuit that is able to distribute heat dissipated by the pipes as evenly as possible, which implies the existence of an impeller pump and a closed circuit. This disclosed closed circuit layout allows for the incorporation of special preventative additives to the fluid for proper functioning through time. This markedly differentiates it from the system of the invention in question, which is designed to forgo the need for a secondary circuit and additional components, allowing for the system to process potable water through its interior and favoring a system configuration that allows for greater solar collection that minimizes energy loss. Additionally, this configuration and the composition of the present invention, with connecting pipes in parallel, allows for the upward running of water inside of it, which in turn allows for thermo-siphoning.

In document GB2445222 an example of a more comprehensive disclosure can be found. In this document, a system is disclosed that allows configuring solar collection covers, without the need to install solar panels as extra elements to a house itself. Modules are made up internally of a series of copper pipes that are welded to copper solar collection propellers. These modules' design thus allows for a greater surface area to capture solar energy and the ability to mount these on roofs of buildings. The cover of these shingles is made of plastic material. This does not allow for thermo-siphoning operation of these modules and requires a secondary circuit that contributes to a heat exchanger, and is commanded by a pump that enables the fluid's movement. To summarize, the product seeks to solve the architectural alterations due to solar panels, betting on spanning a large collection area, rather than efficiently using solar energy in a system. The system of the present invention, on the other hand, is configured to obtain maximum yields, with the simplest system possible, thus avoiding secondary heat exchangers and complex circuits while favoring a simple operating system that can be connected directly to the home network.

Another document regarding state-of-the-art features, mainly focused on construction elements of the box, is DE10321422. In this document the joints of the heat exchanger's receiver box of a type of solar panel are described. The document describes the configuration of an angular piece that enables the mechanical fastening of the box's side panels. Additionally, it describes a superior tab that a second piece fits to to hold together the translucent cover through pressure. The box described in the cited document follows a rigid framework design for the configuration of a solar panel in its interior. The model developed in the present invention poses a box that will allow for the best performance of the solar collector inside the box, i.e., the box is an integral part of the solar collector's design in order to achieve optimum collection and functioning of the operation features described in the preceding paragraphs.

All the documents described deviate from the main purpose of the present invention, and they do not achieve its features, i.e., being low cost, low maintenance, and having a long useful life. These features, combined with its high efficiency, allow for compact units that are easy to install directly to pressurized potable water networks.

From the perspective that the best features in industrial or domestic water circuits are obtained when the prime qualities of the panel are capitalized on, prime application occurs when the panel is used connected to the working pressure of the water of fluid network that one desires to heat, using thermo-siphon convection circulation, or should that fail if an isolated recirculation tank on the panel is not possible, forced circulation towards an isolated recirculation tank connected directly to the network, but located in an arbitrary place, is used.

BRIEF DESCRIPTION OF THE DRAWINGS

FIG. 2 shows a cross-sectional view of the unit for heating potable water. In said cross-section, the contours that make up the box, the insulating material, and the layout of parallel pipes with respect to the translucent cover can be noted. Furthermore, the area that will be shown in detail in the following figure is enclosed in a circle.

In FIG. 3, the detailed view of the area enclosed in a circle in the previous figure can be noted. In this detailing of the cross-section the details of the contours of the principal frame component of the collection unit's box and the layout of the majority of the elements it is made of can be noted.

In FIG. 4, a cross-sectional view of the intake and outflow pipes attached to the parallel pipes can be noted. In this figure one can note how the two units are interconnected, both of which are required to make up the water circuit of an exchange unit of the type preferred by the present invention. The connection between the manifolds through the parallel pipes occurs through thermo-fusion in the preferred method, although alternatively they can be connected through interface.

FIG. 7 shows a curve that is only slightly more vertical than an equivalent curve of a conventional copper piping collection unit, which amounts to a slightly more pronounced sensitivity to increases in the difference between average temperature and room temperature. This implies that in applications where hot water is required for home use and recreational activities, such as in swimming pools and baths, efficiency is entirely comparable with conventional collection units, given that excessively high temperatures are not required.

DETAILED DESCRIPTION

The present invention corresponds to a water-heating solar energy collection unit for high pressure applications and in which the circuit can be exposed to freezing temperatures. The unit is composed of several subsystems that, together, achieve a solar energy collection efficiency only found in more expensive units. This is possible because it is a one-piece heat exchange unit for an hydraulic circuit composed of parallel connecting pipes (1) of polymeric material properly connected at one end to a main intake manifold (2) and properly connected on the other end to a main outflow manifold (3) that also includes as an essential feature a watertight box (4) to house a complete number of exchange units connected in a row, made with a principal frame component, assembled with brackets inserted in the corners, with a translucent top face (6) and with the bottom (7) thermally insulated; whose geometric configuration allows the box to be connected to a supporting structure; and whose configuration holds in the insulation material (8) and the rubber seals of the inner part (9) of the translucent face (6). The configuration allows for the assembly of the complementary frame components (10) on it, attached through elastic interface and where the complementary frame components (10), house rubber seals (11) for the outer part of the translucent face (6) and finally includes, as essential features, a means to connect an intake water feed port (12) to supply the intake manifold and a means to connect the outfeed port, (13) towards the hot water consumption to the main outflow manifold.

Figure 1:
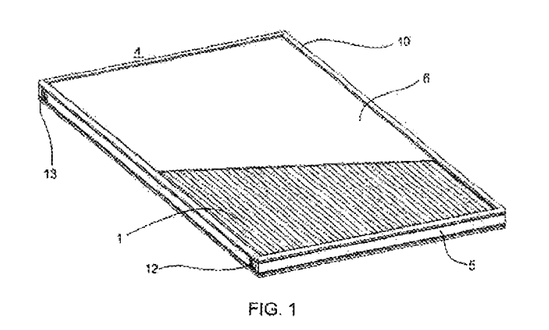
FIG. 1 shows a three-dimensional view of the unit for heating potable water for domestic consumption, or potable water for industrial use, using solar energy. In this figure a part of the translucent panel has been removed to display the arrangement of parallel connecting pipes.
Figure 2:
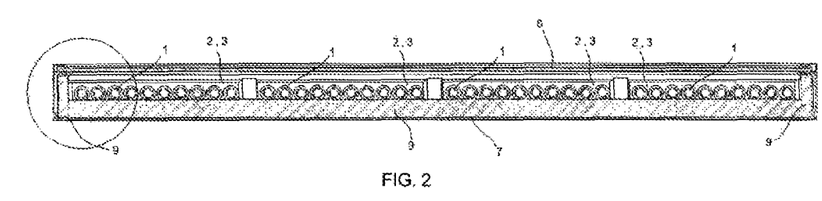
Figure 3:
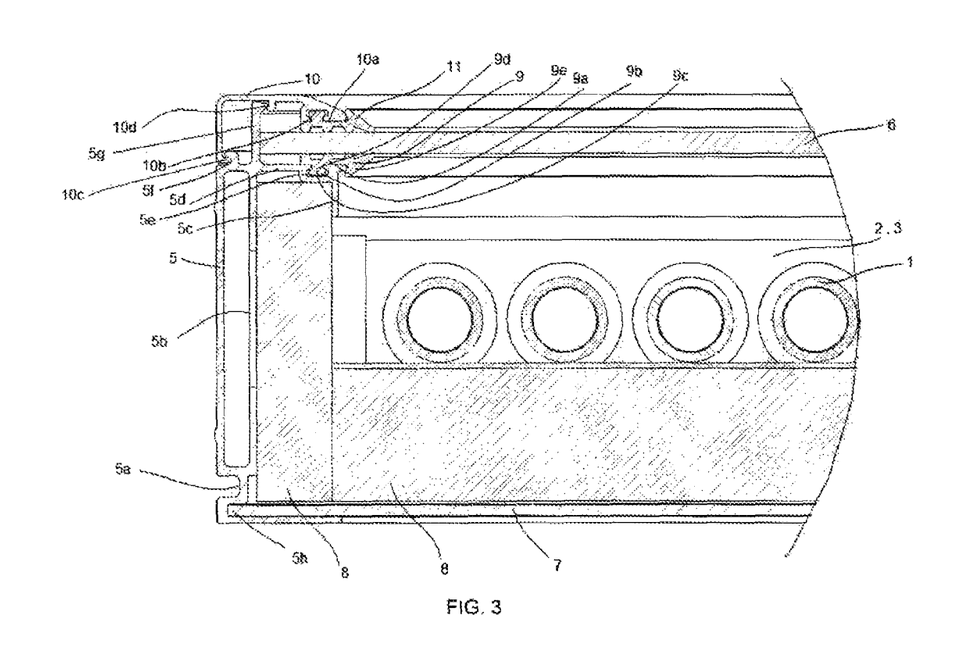

The water-heating solar energy collection unit is configured so that the parallel connecting pipes (1) are sufficiently separated to collect energy, allowing for maximum radiation heating of the pipe's circumference. This dimension is obtained through commitment to proper radiation heating and construction restrictions for the intake manifold (2) and outflow manifold (3). The normal (perpendicular) of parallel connecting pipes (1) section is located in a plane parallel to the surface of the translucent face (6) and the opposite surface of the opposite thermally insulated face and within a defined distance of the translucent face (6) and resting against the inside of the insulation material (8). The distance is defined to ensure a greenhouse effect inside the watertight box (4) to avoid thermal loss during the hours when sunlight is unavailable.

Figure 4:
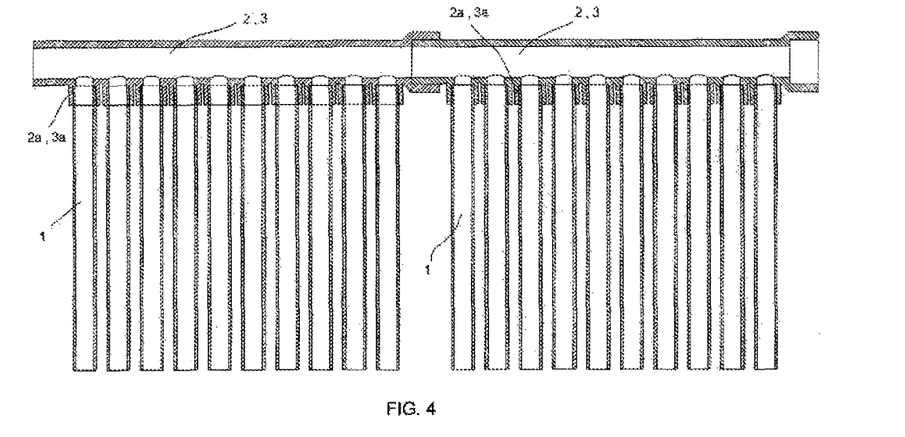

In the solar energy collection unit, the intake manifold (2) and the outflow manifold (3) are identical and have a suitable length and configuration for the injection-molding manufacturing process of a polymer resistant to radiation, pressure, and operating temperatures. Thus, this piece is unique, reducing the costs of molds and inventory parts, which facilitates the industrialized manufacturing of the collection units. Excessively long or irregularly thick units require more complex molds with multiple injection points and heaters to prevent cooling sections from solidifying. By compromising between length and the use of homogenous thicknesses, simpler molds and less complex and more economical injection machines can be used. With this in mind, the intake manifold (2) and outflow manifold (3) have suitable connections for connecting units in a row and for initial feeding (12) and final outflow (13). Thus, dimensions are kept within the margins, which allows efficient injection of the piece and guarantees quality connection between the intake (2) and outflow manifolds (3) which allows for building collection units with the required dimensions, without the need of injecting pieces that are too long. The injection-molding process allows for a unique flexibility so that each of its intake (2a) and outflow female ports (3a) is configured appropriately for connection to parallel connecting pipes (1) in order to have a watertight, pressure-resistant fit. In the preferred method, the water-heating solar energy collection unit uses thermo-fusion coupling, which guarantees pollution-free bonding, where the properties of the material remain unaltered and the final piece is singular where the plastic's macromolecular composition is reconstructed and the coupling is indistinguishable.

In continuing with an appropriate selection of the manufacturing processes, to achieve the goals of the present invention, the parallel connecting pipes (1) are manufactured by extrusion molding and are standardized. This is a common way to make large volumes of standardized pipes homogeneously, efficiently, and with a quality suitable for high mechanical demands that relatively high temperatures and the forces impose on the material by freezing of the liquid in the pipe's canals. This process also allows for the parallel connecting pipes (1) to be cut to a standardized measurement and their ends prepared for union to the intake (2) and outflow manifolds (3) by thermo-fusion. Units with intake and outflow manifolds of suitable length for specialized projects are available, although standardized measurements are preferred so that similar low-cost units can be produced.

For the collection unit using a translucent cover (6) has been defined for the watertight box (4), which capitalizes on its transparency for sunlight, allowing for a best use of the incidental light in terms of heat production. In the preferred method, it uses a commercial alveolar polycarbonate sheet. Through comparative field trials it was determined that this material behaves similarly to its closest equivalent, tempered glass. However, the polycarbonate sheet offers a mechanical durability against impact, which makes it preferable for home use where units may be exposed to sudden, falling objects or vandalism particular to urban areas with highly dense populations. Alternatives are also feasible to use when priority is given to maximum sunlight absorption over mechanical durability.

An important feature that allows for large-scale commercial use of the collection units is ease of installation. Usually, this requires a supporting structure that supports the units to be installed on roofs and terraces, especially when the units are installed on existing buildings that do not have roofs with suitable pitch or orientation. For this, connecting the collection units to the supporting structure is done on the outside principal frame component (5), which is provided by a rectangular slot (5a) on the outside of the frame geometry. Then, with the use of a small plug-in tab (not shown) it is possible to securely hold the panel in place and easily remove it if necessary. If the tab is fixed or properly secured by means that require tools for their removal, this will ensure that the units are not stolen. This type of fastening also provides aesthetic characteristics compatible with assembly in visible places in residential homes.

In order to carry out industrial assembly of the collection units, they have been given a geometric configuration that holds the insulation material in place against the principal frame component (5), which is a rectangular area on its interior open side (5b), covered by a small flap (5a) that protrudes from the translucent face (6) to the opposite face which is the cover (7).

This is how the insulating material (8) holds up against the side faces, allowing for ease of assembly and consistency, thus avoiding malfunctioning from assembly and ensuring good performance during the useful life of the unit.

The principal frame component (5) of the geometric configuration also includes areas to hold in the rubber seals (9) of the interior part of the translucent cover (6) of principal frame component (5), which has a flat face (5d) that touches the interior face of the translucent cover and a rectangular slot (5e) whose entrance is narrower than the slot. The rubber seals (9) are an important functional part of the unit, maintaining a proper seal to prevent the deterioration of the insulating material and grime on the parallel pipes, both of which are scenarios that reduce the efficiency of the panel during its useful life. A similar geometric configuration is provided to hold the rubber seals (9) on the complementary frame component (10), which has a flat face (10a) touching the exterior face of the translucent cover (6) and a rectangular slot (10b) whose entrance is narrower than the slot. In this way, the translucent cover (6) is quickly put in place during the assembly. The geometric configuration also allows for quick maintenance in case the cover needs changing after a prolonged period of use. The geometric configuration to connect the complementary frame component (10) to the principal frame component (5) includes an attachment flange (10c) introducing an edge of the complementary frame component (10) into a slot (5f) on the top edge of the outer face of the principal frame component (5), which protrudes towards the center of the panel in a plane parallel to the translucent face (6); and the rear coupling by elasticity of the tab (10d) on the complementary frame component (10) with a fin (5g) protruding towards the translucent face (6) and away from the smaller side of the principal frame component (5) that touches the translucent side (6).

During assembly, the framework of the geometric configuration is to hold the cover in place, which consists of a rectangular slot (5h) where the edge of the cover (7) is inserted and where one of the sides of the rectangular slot (5h) protrudes to complete the rectangular principal frame component on one of its shorter sides. This enables a good sealing of the back face of the panel and structural durability, as the cover (7) is held in by its surrounding structures and not in specific places with rivets or screws.

Returning to the rubber seals (9 and 11), these are parts from a standardized geometric shape, based on a rectangle one of whose long side (9a) has grooves and whose other long side (9b) has a rectangular projection (9c) away from the respective long side and is located closer to one of the smaller sides and whose base (9d) connects it to the main rectangle and is narrower than the overall width of the rectangular projection (9c); one of its shorter sides (9e), opposite the location of the rectangular projection, ends in a wedge. This unique design of the interior seals (9) and exterior seals (11) reduces parts inventory and the need for different molds. Finally a point of failure is eliminated, like switching seals (9 or 11) during installation. To ensure a long useful life, the rubber seals (9 and 11) are manufactured with rubber ethylene propylene diene monomer (EPDM), compatible with exposure to UV radiation and climate factors typical to the collection unit. Additionally, the geometric form of the seal (9 or 11) is compatible with and fits the rectangular slot (5e) to hold in place the rubber seals for (9) the interior part of the translucent cover (6) of the principal frame component (5), and is compatible with and fits the rectangular slot (10b) that holds the rubber seals of the exterior part(11) of the complementary frame component (10). In such a way, the rubber seals (9 or 11) are fixed to these frames (5 and 10) and they stay in place during assembly, allowing a consistent and normal assembly on an industrial assembly line.

An alternative method, not shown in the figures, for mounting the parallel connecting pipes (1) to the intake (2) and outflow manifolds (3) is that each intake female port (2a) and outflow female port (3a) has a shoulder to fit each parallel connecting pipe (1). In this way, each parallel connecting pipe (1) connects to its respective intake port (2a) and outflow port (3a), and on the shoulder there is a tightening ring that ensures the tightness of the fitting at high pressures.

In the preferred method, the parallel pipes (1) are manufactured with polypropylene R, or randomly sorted polypropylene. This material has been selected for its characteristics which make it applicable, according to various national and international standards, to potable water networks. Moreover, this material has been extensively applied to irrigation systems where it is exposed to environmental conditions such as UV radiation and high temperatures and used for long periods of time, which makes it applicable to the collection units use. In the preferred method, the parallel connecting pipes (1) are 16 mm in diameter (of external circumference) and their thickness is chosen according to standardized procedures regarding working pressure and temperatures according to Chilean Law NCh 3151 or another international equivalent.

In the preferred method, the water-heating solar energy collection unit has parallel connecting pipes (1) that have an appropriate length required for the collection unit and for the space required for the box and the intake manifold and outflow manifold. The outside length of the box is defined for comparative performance tests at 2130 mm.

In addition, in the preferred method the main intake manifold (2) and the main outflow manifold (3) are manufactured with polypropylene R. The main intake manifold (2) and the main outflow manifold (3) have 10 female ports (2a and 3a) with an outer distance between axis of approximately 23 mm and a 30 mm diameter (outer circumference). The connections of the preferred method through thermofusion are designed in accordance with the guidelines of the ISO 15874-3 standard.

In the preferred method, the translucent cover (6) of the box is a commercial alveolar polycarbonate sheet of 4 mm in thickness, which has been selected according to mechanical and thermal insulation requirements of the collection unit. Based on the same considerations, the thermally insulated cover (7) includes an inner layer of insulating material (8) composed of mineral wool 25 mm thick, and a reinforced polyester sheet that corresponds to the cover (7) itself.

Figure 5:
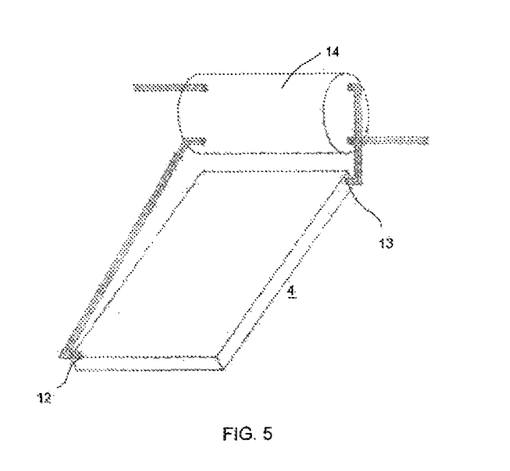
In FIG. 5, one can note a connection layout of a collection unit that is one of the most efficient and capitalizes on the main advantages of the present invention. The connection is direct to the potable water network and circulation between the thermos (hot-water reservoir) and collection unit is through thermo-siphoning; thus, moving parts are not required and the only restriction is the relative location of the thermos to the collection unit, as the thermos must be installed above the collection unit.

The water-heating solar energy collection unit is meant for direct connection to a thermos (14) pressurized to the pressure of the potable water or recreational water network, where the thermos (14) is located above to collection unit to allow the heating of the themos' water (14) through the convection or thermo-siphon circulation. This type of application is the simplest and most direct and takes advantage of all the features of the present invention.

Figure 6:
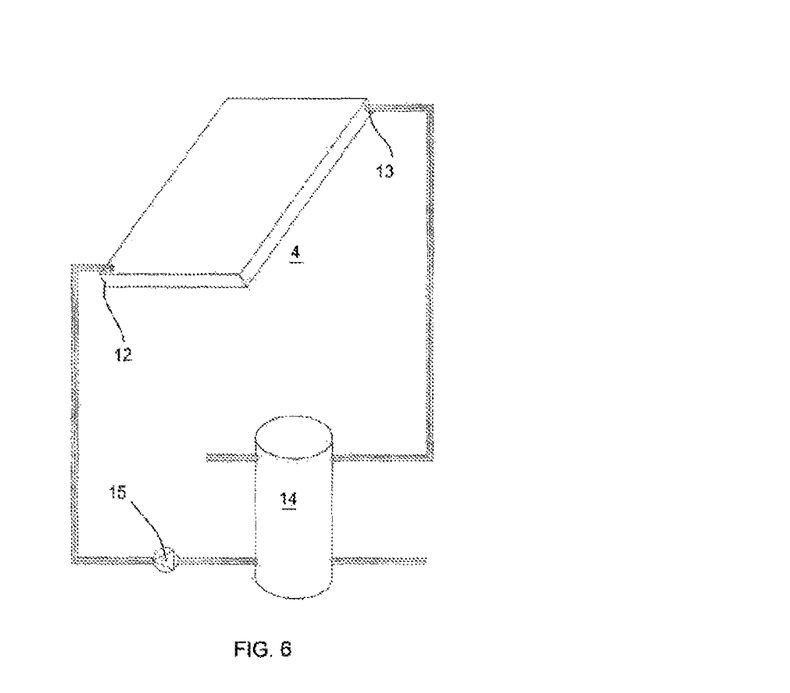
In FIG. 6, an alternative connection scheme is shown that has the advantage of complete flexibility for the thermos' location with respect to collection unit. In this way, the potable water circuit is directly connected to the thermos and circulation between the thermos and the collection unit occurs through a small hydraulic pump.

A slightly different application corresponds to the direct connection of the unit to a pressurized thermos (14) to the water pressure in the network, where the thermos is located in an arbitrary position with respect to the collection unit and circulation is carried out by an hydraulic pump (15). This option may be a little more expensive but allows for a more discreet thermos location (14), which may be desirable in residential applications where minimizing its visual impact is desired.

The efficiency of the present invention's collection unit in its preferred method has been extensively evaluated and is comparable to the efficiency of state-of-the-art collection units manufactured from conventional materials.

Figure 7:
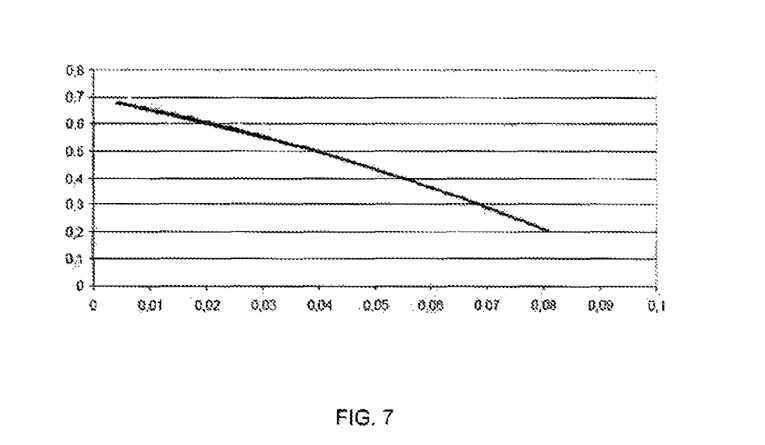
In FIG. 7, a chart of standard tests done on the collection unit is shown, where efficiency on the vertical axis with respect to the difference between room temperature and the average temperature from irradiation that affects the surface of the collection unit can be noted. The vertical axis corresponds to efficiency and the horizontal axis corresponds to $(T_m - T_a)/I$, where $T_m$ corresponds to average water temperature, $T_a$ corresponds to room temperature and I corresponds to solar power per square meter that normally affects the collection unit.

FIG. 7, shows the instantaneous yield curve for the present invention's collection unit, where the vertical axis corresponds to efficiency and the horizontal axis corresponds to (Tm−Ta)/I, where Tm is average water temperature $(T_{out}-T_{in})$ I 2, and $T_a$ corresponds to room temperature, and I corresponds to solar power per square meter that normally affects the collection unit.

The elements described as the preferred method do not limit nor seek to constrain the objective of protecting the present invention.

The invention claimed is:

1. Water-heating solar energy collection unit for high pressure applications and exposure to freezing temperatures, the water-heating solar energy collection unit comprising:
   a plurality heat exchange units, each heat exchange unit including multiple parallel pipes of polymeric material connected by thermo-fusion at one end to a main intake manifold and connected by thermo-fusion at another end to a main outflow manifold such that the multiple parallel pipes, the main intake manifold, and the main outflow manifold of each heat exchange unit forms a single piece of the polymeric material; and
   a water-tight box housing the plurality of exchange units connected in a row, the water-tight box including
      a translucent face,
      a thermally insulated cover position opposite the translucent face,
      a principal frame component configured to connect water-tight the box to a supporting structure and configured to hold insulation material in place inside the water-tight box, and
      a complementary frame component attached to the principal frame component by elastic interface, wherein the complementary frame and the principal frame bracket the translucent face with a first rubber seal coupled to the complementary frame component position on an exterior surface of the translucent face and a second rubber seal coupled to the principal frame component position on an interior surface of the translucent face.

2. The water-heating solar energy collection unit of claim 1, wherein the parallel pipes of each heat exchange unit are arranged with adequate clearance between adjacent pipes of the multiple parallel pipes for collection of energy, allowing radiation heating of a greatest amount of a circumference of each pipe.

3. The water-heating solar energy collection unit of claim 1, wherein the multiple parallel pips of each heat exchange unit are arranged in a plane parallel to the translucent face and the thermally insulated cover, and wherein the multiple parallel pipes of each heat exchange are positioned at a defined distance from the translucent face and are supported by additional insulating material positioned between the multiple parallel pipes and an inside face of the thermally insulated cover.

4. The water-heating solar energy collection unit of claim 1, wherein the main intake manifold and the main outflow manifold of each heat exchange unit are identical and are formed of a polymer injection-molded material that is resistant to radiation pressure and changes in operating temperatures.

5. The water-heating solar energy collection unit of claim 4, wherein the main intake manifold of each heat exchange unit is formed with connections on both ends for coupling the main intake manifold in a series to the main intake manifold of an adjacent heat exchange unit.

6. The water-heating solar energy collection unit of claim 5, wherein the main intake manifold of each heat exchange unit is coupled to the main intake manifold of at least one adjacent heat exchange unit in a high pressure-resistant, sealed union.

7. The water-heating solar energy collection unit of claim 1, wherein the multiple parallel pipes of each heat exchange unit are manufactured by extrusion molding and are standardized.

8. The water-heating solar energy collection unit of claim 7, wherein the multiple parallel pipes are sized to a standard length.

9. The water-heating solar energy collection unit of claim 1, wherein the translucent face of the water-tight box includes an alveolar commercial polycarbonate sheet.

10. The water-heating solar energy collection unit of claim 1, wherein the translucent face of the water-tight box includes a tempered glass sheet.

11. The water-heating solar energy collection unit of claim 1. wherein the principal frame component is configured to connect the water-tight box to the supporting structure by a rectangular slot on an external side face of the principal frame component.

12. The water-heating solar energy collection unit of claim 1, further comprising the insulation material positioned in a rectangular area formed by the principal frame with an interior side open and covered with a small flap protruding from the translucent face towards the thermally insulated cover.

13. The water-heating solar energy collection unit of claim 1, wherein the principal frame component further includes a flat face arranged proximate to the interior surface of the translucent face and that has a rectangular slot whose entrance is narrower than the slot for coupling the second rubber seal to the principal frame component.

14. The water-heating solar energy collection unit of claim 1, wherein the complementary frame component further includes a flat face arranged proximate to the outer surface of the translucent face and that has a rectangular slot whose entrance is narrower than the slot for coupling the first rubber seal to the complementary frame component.

15. The water-heating solar energy collection unit of claim 1, wherein the complementary frame component is coupled to the principal frame component by an attachment flange, wherein the attachment flange includes
   an edge of complementary frame component protruding towards a center of the translucent face in a plane parallel to the translucent face, the edge of the complementary frame component extending into a slot on a top edge of an outer face of the principal frame component, and
   a rear hook of the complementary frame component engaging, by elastic deformation of a tab on the complementary frame component, a fin of the principal frame component protruding towards the translucent face.

16. The water-heating solar energy collection unit of claim 1, wherein the principal frame component further includes a rectangular slot receiving an edge of the thermally insulated cover and where a side of the slot on an exterior surface of the primary frame component protrudes to complete a rectangular section of the primary frame component.

17. The water-heating solar energy collection unit of claim 1, wherein the first rubber seal has a generally-rectangular surface shape, wherein one surface of the generally-rectangular surface shape including grooves and an opposite surface of the of the generally-rectangular surface shape having projection extending away from the generally-rectangular surface shape coupled to the generally-rectangular surface shape by a base that is narrower than the overall width of the projection, and wherein one side of a cross-section of the generally-rectangular surface shape ends in a wedge.

18. The water-heating solar energy collection unit of claim 1, wherein at least one rubber seal selected from a group consisting the first rubber seal and the second rubber seal is manufactured in rubber ethylene propylene diene monomer (EPDM).

19. The water-heating solar energy collection unit of claim 7, wherein the multiple parallel pipes are manufactured from polypropylene R.

20. The water-heating heating solar energy collection unit of claim 19, wherein the multiple parallel pipes each have an outside circumference of 16 mm in diameter.

21. The water-heating heating solar energy collection unit of claim 4, wherein the main intake manifold and the main outflow manifold of each heat exchange unit are manufactured from polypropylene R.

22. The water-heating heating solar energy collection unit of claim 1, wherein the main intake manifold and the main outflow manifold of each heat exchange unit are both coupled to 10 parallel pipes each positioned with a distance between axis of approximately 23 mm.

23. The water-heating heating solar energy collection unit of claim 1, wherein the main intake manifold and the main outflow manifold of each heat exchange unit both have an outside circumference with a diameter of 30 mm.

24. The water-heating heating solar energy collection unit of claim 9, wherein the translucent face of the box includes a commercial alveolar polycarbonate sheet of 4 mm in thickness.

25. The water-heating heating solar energy collection unit of claim 1, wherein the thermally insulated cover includes an inner layer of insulating material made of 25 mm thick mineral wool and a sheet of reinforced polyester.

26. The water-heating heating solar energy collection unit of claim 1, wherein 1 the water-heating solar energy collection unit is directly connected to a thermos pressurized to a pressure of a potable or recreational water network, where the thermos is located over the water-heating solar energy collection unit to allow heating of the water of the thermos through convection or thermo-siphon circulation.

27. The water-heating heating solar energy collection unit of claim 1, wherein the water-heating solar energy collection unit is directly connected to a pressurized thermos to the main network water pressure, where the thermos is located in an arbitrary position with respect to the collection unit and circulation is carried out by an hydraulic pump.

* * * * *